(12) United States Patent
Tsuchida

(10) Patent No.: US 12,468,857 B2
(45) Date of Patent: Nov. 11, 2025

(54) SECURE COMPUTATION SYSTEM, SECURE COMPUTATION SERVER APPARATUS, SECURE COMPUTATION METHOD, AND SECURE COMPUTATION PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

(21) Appl. No.: 18/281,857

(22) PCT Filed: Mar. 18, 2021

(86) PCT No.: PCT/JP2021/011042
§ 371 (c)(1),
(2) Date: Sep. 13, 2023

(87) PCT Pub. No.: WO2022/195799
PCT Pub. Date: Sep. 22, 2022

(65) Prior Publication Data
US 2024/0289493 A1  Aug. 29, 2024

(51) Int. Cl.
*G06F 21/64* (2013.01)
*G09C 1/00* (2006.01)
(Continued)

(52) U.S. Cl.
CPC ............... *G06F 21/64* (2013.01); *G09C 1/00* (2013.01); *G06F 21/552* (2013.01); *G06F 21/60* (2013.01); *G09C 5/00* (2013.01); *H04L 9/00* (2013.01)

(58) Field of Classification Search
None
See application file for complete search history.

(56) References Cited

U.S. PATENT DOCUMENTS 9,614,742 B1 *  4/2017  Zhang ................. H04L 43/0823
2011/0178893 A1 *  7/2011  Kobayashi ............. G06Q 30/06
705/26.3
(Continued)

FOREIGN PATENT DOCUMENTS

CN  112597522 A *  4/2021  ............. G06F 21/64
JP  2014-138349 A  7/2014
(Continued)

OTHER PUBLICATIONS

Jun Furukawa, Yehuda Lindell, Ariel Nof, and Or Weinstein (High-throughput secure three-party computation for malicious adversaries and an honest majority); p. 36; Published in (Year: 2016).*
(Continued)

*Primary Examiner* — Ali H. Cheema
(74) *Attorney, Agent, or Firm* — Sughrue Mion, PLLC

(57) ABSTRACT

An individual secure computation server apparatus in a secure computation system computes, by using a cyclic permutation shared by secure computation server apparatuses except one of the secure computation server apparatuses, a value of a cyclic permutation for the one secure computation server apparatus, performs a fraud detection by performing an equality check on values of cyclic permutations computed by the other secure computation server apparatuses, constitutes a random cyclic permutation by synthesizing the cyclic permutations, applies the random cyclic permutation to a share in a sequence, computes a share which indicates an index and to which the random cyclic permutation has been applied by adding a share having a shift amount of the cyclic permutation to the share which indicates the index, reconstructs the share which indicates the index and to which the random cyclic permutation has been applied, and selects the share corresponding to the index.

20 Claims, 9 Drawing Sheets

(51) Int. Cl.
*G06F 21/55* (2013.01)
*G06F 21/60* (2013.01)
*G09C 5/00* (2006.01)
*H04L 9/00* (2022.01)

(56) References Cited

U.S. PATENT DOCUMENTS

| | | | |
|---|---|---|---|
| 2016/0335924 A1 | 11/2016 | Ikarashi et al. | |
| 2017/0242924 A1* | 8/2017 | Cash | G06F 21/6218 |
| 2020/0125724 A1 | 4/2020 | Ikarashi | |
| 2020/0143514 A1* | 5/2020 | Yadav | G06T 11/60 |
| 2020/0336156 A1* | 10/2020 | Kim | H03M 13/114 |
| 2022/0141000 A1 | 5/2022 | Tsuchida et al. | |

FOREIGN PATENT DOCUMENTS

| | | |
|---|---|---|
| WO | 2015/107952 A1 | 7/2015 |
| WO | 2018/216512 A1 | 11/2018 |
| WO | 2020/165932 A1 | 8/2020 |

OTHER PUBLICATIONS

David Evans, Vladimir Kolesnikov, and Mike Rosulek (A Pragmatic Introduction to Secure Multi-Party Computation); p. 181; Published in Apr. 15, 2020.*

JP Office Action for JP Application No. 2023-506621, mailed on Jun. 4, 2024 with English Translation.

Keitaro Hiwatashi et al., "A Secure Array Access Protocol with Constant Communication Rounds and Log Size Communication Complexities", Computer Security Symposium 2020, Oct. 2020, pp. 1118-1125.

International Search Report for PCT Application No. PCT/JP2021/011042, mailed on Jun. 15, 2021.

Marina Blanton, Ahreum Kang, and Chen Yuan. "Improved building blocks for secure multi-party computation based on secret sharing with honest majority", International Conference on Applied Cryptography and Network Security. Springer, Cham, 2020.

* cited by examiner

SECURE COMPUTATION SYSTEM, SECURE COMPUTATION SERVER APPARATUS, SECURE COMPUTATION METHOD, AND SECURE COMPUTATION PROGRAM

This application is a National Stage Entry of PCT/JP2021/011042 filed on Mar. 18, 2021, the contents of all of which are incorporated herein by reference, in their entirety.

FIELD

Technical Field

The present invention relates to a secure computation system, a secure computation server apparatus, a secure computation method, and a secure computation program.

Background

In recent years, research and development have been actively conducted on a technique referred to as secure computation. Secure computation is one of the techniques for executing predetermined processing while keeping its computation processes and the results thereof secret to third parties. One typical technique used for secure computation is a multiparty computation technique. In this multiparty computation technique, data that needs to be kept secret is dispersedly distributed to a plurality of servers (secure computation server apparatuses), and each server performs various operations on the data distributed thereto while keeping the data secret. The data dispersedly distributed to the individual secure computation server apparatuses is called "shares". Hereinafter, unless otherwise stated, the term "secure computation" used herein signifies the multi-party computation technique.

One of the processes performed in the secure computation is sequence reference. Sequence reference is a process for referring to elements arranged and stored in a sequence. In this sequence reference in the secure computation, when the elements in a sequence are referred to, indexes allocated to these elements are used, and there is a demand for concealing these indexes, too. That is, there is a demand for enabling reading and writing of desired elements in a sequence while concealing which elements in the sequence are being accessed.

For example, credit decisions, etc., are made by using a plurality of items of information, and there is a situation where a user wishes to conceal not only the contents of items of information but also the items of information used to make a credit decision. In response to such a demand, there is an application in which the secure computation uses a sequence reference that conceals indexes. In addition, by analyzing a pattern of access to the elements in a sequence, information could be leaked. Thus, accessing the elements in a sequence while concealing the access pattern is advantageous in term of security.

NPL 1: Marina Blanton, Ahreum Kang, and Chen Yuan. "Improved building blocks for secure multi-party computation based on secret sharing with honest majority." International Conference on Applied Cryptography and Network Security. Springer, Cham, 2020

SUMMARY

The disclosure of the above citation list is incorporated herein in its entirety by reference thereto. The following analysis has been made by the present inventors.

In the secure computation using the multiparty computation technique, data that needs to be kept secret is dispersedly distributed to a plurality of servers, and these servers perform their processing. Thus, to improve the efficiency of the processing, the communication cost needs to be reduced. This communication cost can be divided into the communication amount representing the amount of communication target data and the communication round number representing the number of communications performed when the maximum parallelization is performed.

Regarding this relationship between the communication amount and the round number, depending on the environment, a different one of the communication amount and the communication round number needs to be prioritized over the other. For example, in an environment in which the communication delay is large, such as in a WAN (Wide Area Network) environment, a fewer number of communications is more advantageous. Thus, it is preferable that the secure computation be performed with a fewer number of communication rounds, more preferably, with a constant number of rounds.

Of course, the security of the secure computation also needs to be ensured. There are various levels in terms of the security of the secure computation, and "semi-honest secure" is known as a typical security level. An attack for obtaining information about the input and values acquired in the computation processes while conforming to the protocol is referred to as a semi-honest attack. If the security against this semi-honest attack is ensured, this secure computation is considered as being semi-honest secure.

However, a participant who attempts an attack to falsify a computation result by deviating from the protocol could slip into the secure computation using the multiparty computation technique. Detecting the falsification of a value by such a dishonest participant is referred to as fraud detection. Although NPL 1 discusses a sequence reference protocol that achieves the communication cost with a constant number of rounds, this technique is semi-honest secure. Thus, in this sense, the fraud detection cannot be performed. Therefore, there is a demand for a sequence reference protocol that achieves the communication cost with a constant number of rounds and that has an improved security enabling the fraud detection.

In view of the above-described problem, an object of the present invention is to provide a secure computation system, a secure computation server apparatus, a secure computation method, and a secure computation program that contribute to both reducing the communication cost and improving the security while using a sequence reference protocol.

According to a first aspect of the present invention, there is provided a secure computation system, including at least four secure computation server apparatuses connected to each other via a network, receiving a share which indicates index, and referring to a share of an element in a sequence corresponding to the indexes from the shares in the sequence, an individual one of the secure computation server apparatuses including: a local cyclic permutation part that computes, by using a cyclic permutation shared by (other) secure computation server apparatuses except one of the at least four secure computation server apparatuses, a value of a cyclic permutation for the one secure computation server apparatus; a comparison and verification part that performs a fraud detection by performing an equality check on a plurality of values of cyclic permutations computed by the secure computation server apparatuses except oneself of the at least four secure computation server apparatuses; a permutation synthesis part that constitutes a random cyclic permutation that is traceable by none of the at least four secure computation server apparatuses by synthesizing the cyclic permutations constituted by the local cyclic permutation parts of the secure computation server apparatuses; a sequence shuffle part that applies the random cyclic permutation to the shares in the sequence; an index computation part that computes a share which indicates an index and to which the random cyclic permutation has been applied by adding a share having a shift amount of the cyclic permutation constituted by the local cyclic permutation parts to the received share which indicates the index; and a sequence selection part that reconstructs the share which indicates the index and to which the random cyclic permutation has been applied and that selects a share corresponding to the reconstructed index from the shares in the sequence to which the random cyclic permutation has been applied.

According to a second aspect of the present invention, there is provided a secure computation server apparatus, which is one of at least four secure computation server apparatuses connected to each other via a network, each of the secure computation server apparatuses receiving a share which indicates an index, and referring to a share of an element in a sequence corresponding to the index from the shares in the sequence, the secure computation server apparatus including: a local cyclic permutation part that computes, by using a cyclic permutation shared by (other) secure computation server apparatuses except one of the at least four secure computation server apparatuses, a value of a cyclic permutation for the one secure computation server apparatus; a comparison and verification part that performs a fraud detection by performing an equality check on a plurality of values of cyclic permutations computed by the secure computation server apparatuses except oneself of the at least four secure computation server apparatuses; a permutation synthesis part that constitutes a random cyclic permutation that is traceable by none of the at least four secure computation server apparatuses by synthesizing the cyclic permutations constituted by the local cyclic permutation parts of the secure computation server apparatuses; a sequence shuffle part that applies the random cyclic permutation to the shares in the sequence; an index computation part that computes a share which indicates an indexes and to which the random cyclic permutation has been applied by adding a share having a shift amount of the cyclic permutation constituted by the local cyclic permutation parts to the received shares which indicates the index; and a sequence selection part that reconstructs the share which indicates the index and to which the random cyclic permutation has been applied and that selects a share corresponding to the reconstructed index from the shares in the sequence to which the random cyclic permutation has been applied.

According to a third aspect of the present invention, there is provided a secure computation method, using at least four secure computation server apparatuses connected to each other via a network, receiving a share which indicates an index, and referring to a share of an element in a sequence corresponding to the index from the shares in the sequence, the secure computation method including: a local cyclic permutation step of computing, by using a cyclic permutation shared by (other) secure computation server apparatuses except one of the at least four secure computation server apparatuses, a value of a cyclic permutation for the one secure computation server apparatus; a comparison and verification step of performing a fraud detection by performing an equality check on a plurality of values of cyclic permutations computed by the secure computation server apparatuses except oneself of the at least four secure computation server apparatuses; a permutation synthesis step of constituting a random cyclic permutation that is traceable by none of the at least four secure computation server apparatuses by synthesizing the cyclic permutations constituted in the local cyclic permutation step; a sequence shuffle step of applying the random cyclic permutation to the shares in the sequence; an index computation step of computing a share which indicates index and to which the random cyclic permutation has been applied by adding a share having a shift amount of the cyclic permutation constituted by the local cyclic permutation step to the received share which indicates the index; and a sequence selection step of reconstructing the share which indicates the index and to which the random cyclic permutation has been applied and selecting a share corresponding to the reconstructed index from the shares in the sequence to which the random cyclic permutation has been applied.

According to a fourth aspect of the present invention, there is provided a secure computation program, causing each of at least four secure computation server apparatuses connected to each other via a network, each of the secure computation server apparatuses receiving a share which indicates index, and referring to a share of an element in a sequence corresponding to the index from the shares in the sequence, to perform: local cyclic permutation processing for computing, by using a cyclic permutation shared by (other) secure computation server apparatuses except one of the at least four secure computation server apparatuses, a value of a cyclic permutation for the one secure computation server apparatus; comparison and verification processing for performing a fraud detection by performing an equality check on a plurality of values of cyclic permutations computed by the secure computation server apparatuses except oneself of the at least four secure computation server apparatuses; permutation synthesis processing for constituting a random cyclic permutation that is traceable by none of the at least four secure computation server apparatuses by synthesizing the cyclic permutations constituted by the local cyclic permutation processing; sequence shuffle processing for applying the random cyclic permutation to the shares in the sequence; index computation processing for computing a share which indicates an index and to which the random cyclic permutation has been applied by adding a share having a shift amount of the cyclic permutation constituted by the local cyclic permutation processing to the received share which indicates the index; and sequence selection processing for reconstructing the share which indicates the index and to which the random cyclic permutation has been applied and selecting a share corresponding to the reconstructed indexes from the shares in the sequence to which the random cyclic permutation has been applied. The program can be recorded in a computer-readable storage medium. The storage medium may be a non-transient storage medium such as a semiconductor memory, a hard disk, a magnetic recording medium, or an optical recording medium. The present invention can be embodied as a computer program product.

According to the individual aspects of the present invention, it is possible to provide a secure computation system, a secure computation server apparatus, a secure computation method, and a secure computation program that contribute to both reducing the communication cost and improving the security while using a sequence reference protocol.

EXAMPLE EMBODIMENTS

Figure 1:
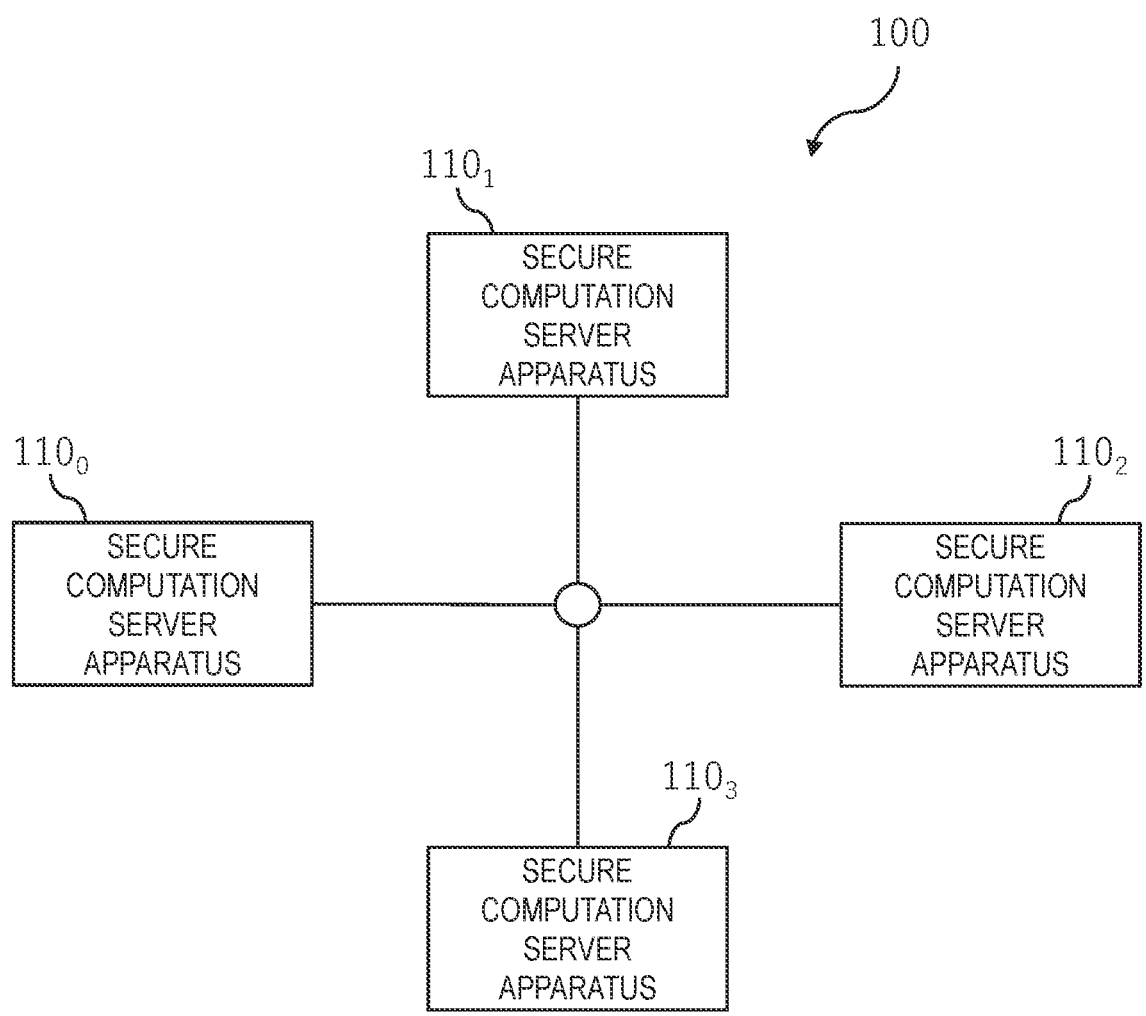
FIG. 1 is a block diagram illustrating a functional configuration example of a secure computation system according to a first example embodiment.

Hereinafter, example embodiments of the present invention will be described with reference to the accompanying drawings. However, the present invention is not limited to the following example embodiments. In addition, in the drawings, the same or equivalent elements are denoted by the same reference characters, as necessary. In addition, the drawings are schematic drawings, and therefore, it should be noted that the sizes, ratios, etc. of the individual elements may differ from their actual sizes, ratios, etc. An element in a drawing may have a portion whose size or ratio differs from that of the portion of the element in a different drawing.

First Example Embodiment

Hereinafter, a secure computation system and secure computation server apparatuses according to a first example embodiment will be described with reference to FIGS. 1 and 2. The first example embodiment is an example embodiment for describing only a basic concept of the present invention.

FIG. 1 is a block diagram illustrating a functional configuration example of the secure computation system according to the first example embodiment. As illustrated in FIG. 1, a secure computation system 100 according to the first example embodiment includes at least zeroth to third secure computation server apparatuses $110_i$ (i=0, 1, 2, 3). These zeroth to third secure computation server apparatuses $110_i$ (i=0, 1, 2, 3) are connected to each other via a network such that these apparatuses can communicate with each other. The circle in the middle in FIG. 1 represents a network.

In the secure computation system 100 including the zeroth to third secure computation server apparatuses $110_i$ (i=0, 1, 2, 3), it is possible to compute target shares from a value inputted to any one of the zeroth to third secure computation server apparatuses $110_i$ (i=0, 1, 2, 3) while keeping the input value and the values acquired in the computation processes secret, and it is possible to dispersedly store the computation results in the zeroth to (N−1)th secure computation server apparatuses $110_i$ (i=0, 1, 2, 3).

In addition, in the secure computation system 100 including the zeroth to third secure computation server apparatuses $110_i$ (i=0, 1, 2, 3), it is possible to compute target shares from the shares dispersedly stored in the zeroth to third secure computation server apparatuses $110_i$ (i=0, 1, 2, 3) while keeping the values in the computation processes secret, and it is possible to dispersedly store the computation results in the zeroth to (N−1)th secure computation server apparatuses $110_i$ (i=0, 1, 2, 3).

The shares of the computation results may be reconstructed by causing the zeroth to third secure computation server apparatuses $110_i$ (i=0, 1, 2, 3) to exchange their shares with each other. Alternatively, the shares may be decoded by transmitting the shares to an external apparatus other than the zeroth to (N−1)th secure computation server apparatuses $110_i$ (i=0, 1, 2, 3).

The secure computation system 100 according to the first example embodiment illustrated in FIG. 1 is a secure computation system that receives a share which indicates index, and that refers to a share of an element in a sequence corresponding to the index from the shares in the sequence. Each of the zeroth to third secure computation server apparatuses $110_i$ (i=0, 1, 2, 3) is operated by an independent participant $P_i$ (i=0, 1, 2, 3). In addition, in the secure computation system 100 including the zeroth to third secure computation server apparatuses $110_i$ (i=0, 1, 2, 3), even if part of the zeroth to third secure computation server apparatuses $110_i$ (i=0, 1, 2, 3) is operated by a dishonest participant, a fraud can be detected.

Figure 2:
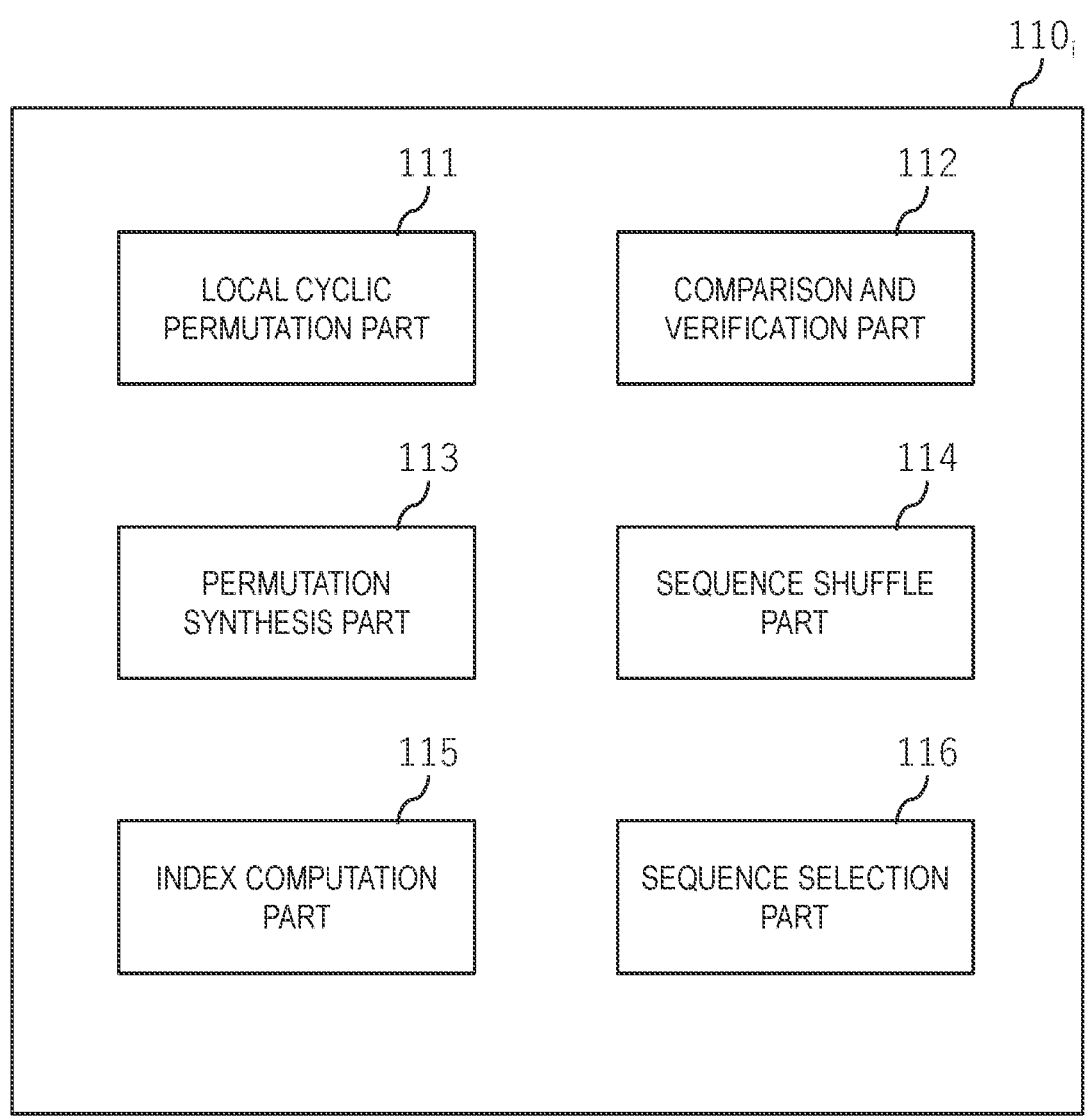
FIG. 2 is a block diagram illustrating a functional configuration example of a secure computation server apparatus according to the first example embodiment.

To achieve this, as illustrated in FIG. 2, each of the zeroth to third secure computation server apparatuses $110_i$ (i=0, 1, 2, 3) includes a local cyclic permutation part 111, a comparison and verification part 112, a permutation synthesis part 113, a sequence shuffle part 114, an index computation part 115, and a sequence selection part 116. FIG. 2 is a block diagram illustrating a functional configuration example of a secure computation server apparatus according to the first example embodiment.

The local cyclic permutation part 111 computes, by using a cyclic permutation shared by three of the zeroth to third secure computation server apparatuses $110_i$ (i=0, 1, 2, 3), a value of a cyclic permutation for the other secure computation server apparatus.

The comparison and verification part 112 that performs a fraud detection by performing an equality check on a plurality of values of cyclic permutations computed by the zeroth to third secure computation server apparatuses $110_i$ (i=0, 1, 2, 3) except its host secure computation server apparatus $110_i$. For example, when a cyclic permutation for the zeroth secure computation server apparatus $110_0$ is computed by using a cyclic permutation shared by the first to third secure computation server apparatuses $110_i$ (i=1, 2, 3), the zeroth secure computation server apparatus $110_0$ receives values obtained after the application of the cyclic permutation, the values being supposed to be the same value, from the first to third secure computation server apparatuses $110_i$ (i=1, 2, 3). However, if one of the first to third secure computation server apparatuses $110_i$ (i=1, 2, 3) is operated by a dishonest participant and if a value has been falsified, the values received by the zeroth secure computation server apparatus $110_0$ do not match. The comparison and verification part 112 performs a fraud detection by performing an equality check as described above.

The permutation synthesis part 113 constitutes a random cyclic permutation that is traceable by none of the zeroth to third secure computation server apparatuses $110_i$ (i=0, 1, 2, 3) by synthesizing the cyclic permutations constituted by the local cyclic permutation parts 111 of the zeroth to third secure computation server apparatuses $110_i$ (i=0, 1, 2, 3).

The cyclic permutation constituted by one local cyclic permutation part 111 is a cyclic permutation that is not traceable by its host one of the zeroth to third secure computation server apparatuses 110$_i$ (i=0, 1, 2, 3). Assuming that the cyclic permutation that is not traceable by an i-th secure computation server apparatus 110$_i$ is σ$_i$, σ=σ$_0$ σ$_1$ σ$_2$ σ$_3$ is a random cyclic permutation that is traceable by none of the zeroth to third secure computation server apparatuses 110$_i$ (i=0, 1, 2, 3).

The sequence shuffle part 114 applies the random cyclic permutation to the shares in the reference target sequence. Since the random cyclic permutation is not traceable by none of the zeroth to third secure computation server apparatuses 110$_i$ (i=0, 1, 2, 3), the sequence after the application of the random cyclic permutation also becomes unclear to the zeroth to third secure computation server apparatuses 110$_i$ (i=0, 1, 2, 3). In other words, information about the indexes is lost from the shares in the sequence.

The index computation part 115 computes a share which indicates index and to which the random cyclic permutation has been applied by adding a share having shift amounts of the cyclic permutation constituted by the local cyclic permutation parts 111 to the received share which indicates the index. As described above, by applying the random cyclic permutation to the shares in the reference target sequence, information about the indexes is lost from the shares in the sequence. Thus, by adding a share having shift amounts of the cyclic permutation to the received share which indicates the index, the index computation part 115 computes a share which indicates index and to which the random cyclic permutation has been applied. The computation principle will be described in detail below.

The sequence selection part 116 reconstructs the share which indicates the index and to which the random cyclic permutation has been applied and selects a share corresponding to the reconstructed index from the shares in the sequence to which the random cyclic permutation has been applied.

Figure 3:
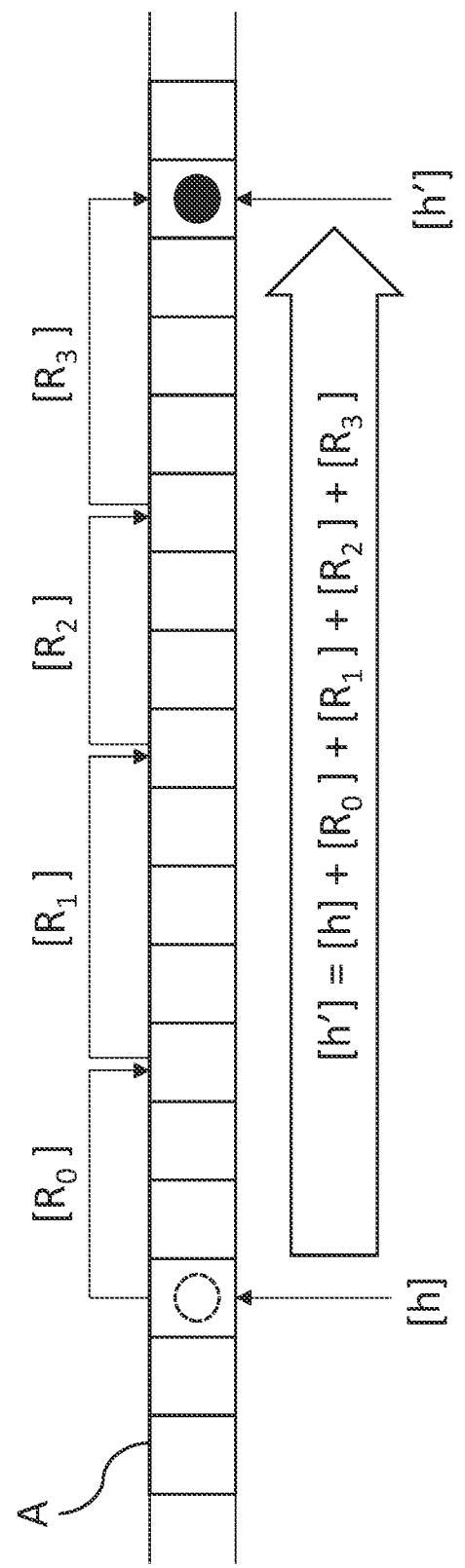
FIG. 3 is a drawing illustrating a principle of computing a share which indicates index after a random cyclic permutation has been applied.

FIG. 3 is a drawing illustrating a principle of computing a share which indicates index after a random cyclic permutation has been applied. As illustrated in FIG. 3, in the sequence reference, it is possible to refer to desired data from an arranged and stored dataset. Concretely, an arranged and stored dataset is given indexes, and by specifying an index, it is possible to refer to desired data.

Herein, in the sequence reference in a secure computation, the indexes are also kept secret. That is, the participants in the secure computation cannot directly determine which data they need to access. In the above-described secure computation system 100, the sequence reference is performed in accordance with the following mechanism.

First, a random cyclic permutation constructed as described above is applied to a target sequence. That is, assuming that the cyclic permutation untraceable by the i-th secure computation server apparatus 110$_i$ is σ$_i$, the random cyclic permutation a obtained by synthesizing these cyclic permutations (σ=σ$_1$ σ$_2$ σ$_3$) is applied to a target sequence. Herein, assuming that the shift amount of the cyclic permutation σ$_i$ is R$_i$, the shift amount of the random cyclic permutation a is expressed by R$_0$+R$_1$+R$_2$+R$_3$. Thus, if the reference target index is h, the index that needs to be referred to after the random cyclic permutation has been applied is expressed by h'=h+R$_0$+R$_1$+R$_2$+R$_3$. These computations are performed as secure computations while being kept secret.

Herein, it should be noted that the i-th secure computation server apparatus 110$_i$ cannot trace the cyclic permutation σ$_i$. That is, the i-th secure computation server apparatus 110$_i$ cannot determine the shift amount R$_i$ of the cyclic permutation σ$_i$. Consequently, the i-th secure computation server apparatus 110$_i$ cannot compute the original index h from the reference target index h' after the random cyclic permutation has been applied, by using the computation expression h'=h+R$_0$+R$_1$+R$_2$+R$_3$.

As described above, in the above-described secure computation system 100, it is possible to compute the reference target index h' after the random cyclic permutation has been applied while concealing the original index h.

(Secure Computation Method)

Figure 4:
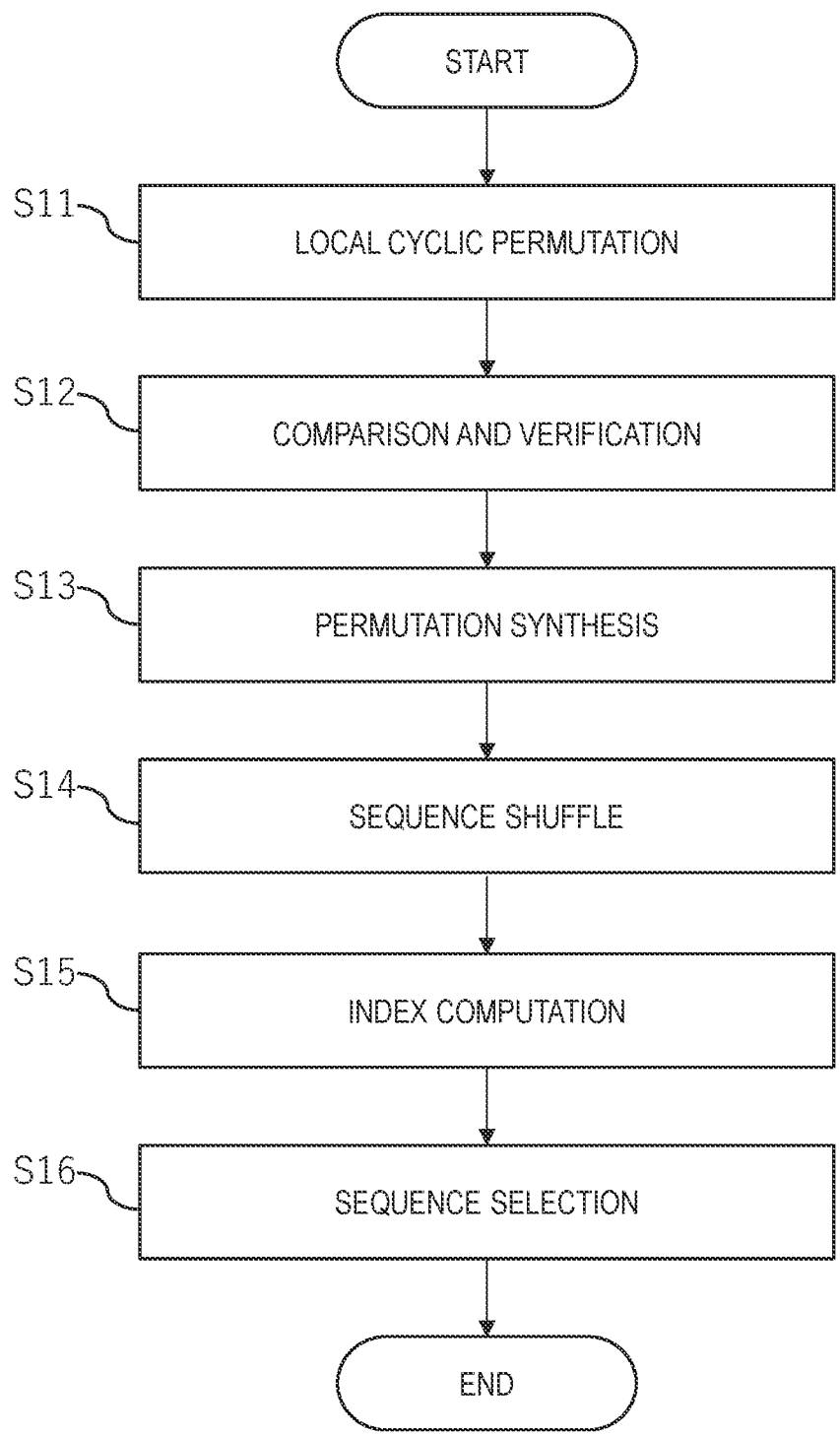
FIG. 4 is a flowchart illustrating an outline of a procedure of a secure computation method according to the first example embodiment.

FIG. 4 is a flowchart illustrating an outline of a procedure of a secure computation method according to the first example embodiment. The procedure of the secure computation method illustrated in FIG. 4 is only a typical example of the procedure of the secure computation and will be described to facilitate the description. In practice, the secure computation method can be modified, such as by changing the order of some of the steps or repeating some of the steps.

As illustrated in FIG. 4, the secure computation method according to the first example embodiment includes a local cyclic permutation step (step S11), a comparison and verification step (step S12), a permutation synthesis step (step S13), a sequence shuffle step (step S14), an index computation step (step S15), and a sequence selection step (step S16).

The local cyclic permutation step (step S11) includes computing, by using a cyclic permutation shared by three of the zeroth to third secure computation server apparatuses 110$_i$ (i=0, 1, 2, 3), a value of a cyclic permutation for the other secure computation server apparatus.

The comparison and verification step (step S12) includes performing a fraud detection by performing an equality check on a plurality of values of cyclic permutations computed by the zeroth to third secure computation server apparatuses 110$_i$ (i=0, 1, 2, 3) except one (oneself) of the secure computation server apparatuses.

The permutation synthesis step (step S13) includes constituting a random cyclic permutation that is traceable by none of the zeroth to third secure computation server apparatuses 110$_i$ (i=0, 1, 2, 3) by synthesizing the cyclic permutations of the zeroth to third secure computation server apparatuses 110$_i$ (i=0, 1, 2, 3) in the local cyclic permutation step (step S11).

The sequence shuffle step (step S14) includes applying the random cyclic permutation to the shares in the reference target sequence.

The index computation step (step S15) includes computing a share which indicates index and to which the random cyclic permutation has been applied by adding a share having a shift amount of the cyclic permutation constituted by the local cyclic permutation parts to the received share which indicates the index. This computation principle has already been described above.

The sequence selection step (step S16) includes reconstructing the share which indicates the index and to which the random cyclic permutation has been applied and selecting a share corresponding to the reconstructed index from the shares in the sequence to which the random cyclic permutation has been applied.

As seen from the above description, the local cyclic permutation step (step S11), the comparison and verification step (step S12), the permutation synthesis step (step S13), and the sequence shuffle step (step S14) do not need input of the shares indicating the indexes. Thus, in a situation such as in Private Information Retrieval, it is possible to use a so-called offline-online paradigm in which the local cyclic permutation step (step S11), the comparison and verification step (step S12), the permutation synthesis step (step S13), and the sequence shuffle step (step S14) are performed in advance without waiting for input of the shares indicating the indexes.

As described above, the secure computation system and the secure computation method according to the first example embodiment enable a fraud detection while using a sequence reference protocol that achieves the communication cost even with a constant number of rounds. That is, the secure computation system and the secure computation method according to the first example embodiment contribute to both reducing the communication cost and improving the security while using a sequence reference protocol.

The above-described first example embodiment is an example embodiment for describing only a basic concept of the present invention. Hereinafter, in the description of a second example embodiment and a third example embodiment, the above-described concept will be applied to a specific secret sharing scheme.

Second Example Embodiment

Next, a secure computation system according to a second example embodiment will be described with reference to FIG. 5.

Figure 5:
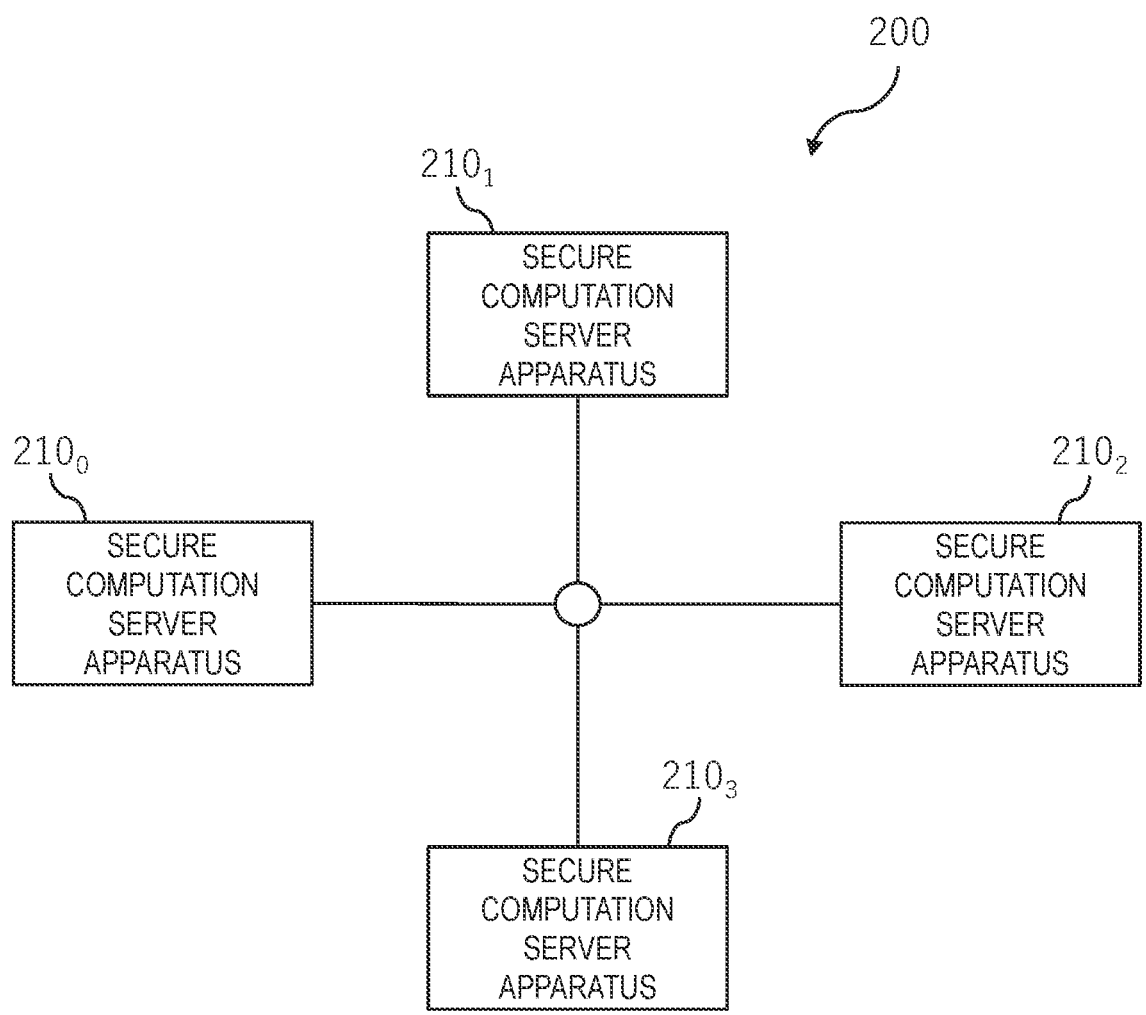
FIG. 5 is a block diagram illustrating a functional configuration example of a secure computation system according to a second example embodiment.

FIG. 5 is a block diagram illustrating a functional configuration example of the secure computation system according to the second example embodiment. As illustrated in FIG. 5, a secure computation system 200 according to the second example embodiment includes zeroth to third secure computation server apparatuses $210_i$ (i=0, 1, 2, 3). The zeroth to third secure computation server apparatuses $210_i$ (i=0, 1, 2, 3) are connected to each other via a network such that these apparatuses can communicate with each other.

The secure computation system 200 according to the second example embodiment illustrated in FIG. 5 is a secure computation system that receives a share which indicates index, and that refers to a share of an element in a sequence corresponding to the index from the shares in the sequence. Each of the zeroth to third secure computation server apparatuses $210_i$ (i=0, 1, 2, 3) is operated by an independent participant $P_i$ (i=0, 1, 2, 3). In addition, in the secure computation system 200 including the zeroth to third secure computation server apparatuses $210_i$ (i=0, 1, 2, 3), even if part of the zeroth to third secure computation server apparatuses $210_i$ (i=0, 1, 2, 3) is operated by a dishonest participant, a fraud can be detected. When a fraud is detected, the secure computation system 200 can stop its processing.

[Secret Sharing Scheme]

The secure computation system 200 according to the second example embodiment can adopt a 2-out-of-4 replicated secret sharing scheme. Concretely, the shares of an element v on a residue class ring $Z_L$ of modulo L on the residue class ring $Z_L$ ($v \in Z_L$) are constituted as follows.

$$[v]_L = ([v]_{L,0}, [v]_{L,1}, [v]_{L,2}, [v]_{L,3})$$

when $m_v, \lambda_v, \lambda_{v,1}, \lambda_{v,2}, \lambda_{v,3} \in Z_L$, $$m_v = v + \lambda_v \bmod L$$
$$\lambda_v = \lambda_{v,1} + \lambda_{v,2} + \lambda_{v,3} \bmod L$$

In this case, the shares of the individual participants $P_i$ (i=0, 1, 2, 3) are defined as follows.

The share of the participant $P_0$: $[v]_{L,0} = (\lambda_{v,1}, \lambda_{v,2}, \lambda_{v,3})$ The share of the participant $P_1$: $[v]_{L,1} = (m_v, \lambda_{v,2}, \lambda_{v,3})$ The share of the participant $P_2$: $[v]_{L,2} = (m_v, \lambda_{v,3}, \lambda_{v,1})$ The share of the participant $P_3$: $[v]_{L,3} = (m_v, \lambda_{v,1}, \lambda_{v,2})$ In the 2-out-of-4 replicated secret sharing scheme constructed as described above, it is possible to reconstruct the element $v \in Z_L$ as follows.

$$v = m_v - \lambda_{v,1} - \lambda_{v,2} - \lambda_{v,3}$$

The shares regarding a sequence V having a sequence length N ($V = (\lambda_0, \lambda_1, \ldots, \lambda_j, \ldots, \lambda_{N-1})$) are constructed as follows.

$$m_{vj} = v_j + \lambda_{vj} \bmod L$$
$$\lambda_{vj} = \lambda_{vj,1} + \lambda_{vj,2} + \lambda_{vj,3} \bmod L$$
$$M = (m_{vj}, \ldots, m_{vN-1})$$
$$\Lambda_1 = (\lambda_{vj,1}, \ldots, \lambda_{vN-1,1})$$
$$\Lambda_2 = (\lambda_{vj,2}, \ldots, \lambda_{vN-1,2})$$
$$\Lambda_3 = (\lambda_{vj,3}, \ldots, \lambda_{vN-1,3})$$

[Shuffle]

For example, a case in which a cyclic permutation for the zeroth participant $P_0$ is computed by using a cyclic permutation shared by the first to third participants $P_i$ (i=1, 2, 3) will be described. The cyclic permutation for the zeroth participant $P_0$ can be constituted as follows by using a cyclic permutation $\sigma_0$ shared by the first to third participants $P_i$ (i=1, 2, 3).

The first to third participants $P_i$ (i=1, 2, 3) apply the cyclic permutation $\sigma_0$ to the values of $\Lambda_1, \Lambda_2$, and $\Lambda_3$, mask the resultant values, and transmit the masked values to the zeroth participant $P_0$. In other words, the first to third participants $P_i$ (i=1, 2, 3) compute, for the zeroth participant $P_0$, the values of $\Lambda_1, \Lambda_2$, and $\Lambda_3$ to which the cyclic permutation $\sigma_0$ has been applied, and transmit these values to the zeroth participant $P_0$.

Senders $\{P_1, P_2\}$: $\alpha_3 + \sigma_0(\Lambda_3)$

Senders $\{P_2, P_3\}$: $\alpha_1 + \sigma_0(\Lambda_1)$

Senders $\{P_1, P_3\}$: $\alpha_2 + \sigma_0(\Lambda_2)$

Note that $\alpha_i=(\alpha_{i,0}, \alpha_{i,1}, \ldots, \alpha_{i,j}, \ldots \alpha_{i,N-1})$ (i=1, 2, 3) is a mask that can be computed with a key and a pseudorandom function that only the sender knows, satisfying $\alpha_{0,j}+\alpha_{1,j}+\alpha_{2,j}+\alpha_{3,j}=0 \mod L$ (i=0, 1, ..., N−1).

As seen from the above construction, the zeroth participant $P_0$ receives two same values (obtained by applying the cyclic permutation $\sigma_0$ to $\Lambda_1$, $\Lambda_2$, and $\Lambda_3$ and masking the resultant values). Next, the zeroth participant $P_0$ performs a fraud detection by performing an equality check on the plurality of values obtained after the application of the cyclic permutation.

Concretely, if the values, which are supposed to be the same value, are different from each other, the participant $P_0$ determines that there is a dishonest participant among the participants and this dishonest participant has falsified a value, and stops its processing. For example, the participant $P_1$ and the participant $P_2$ transmit the same value to the participant $P_0$. However, for example, the participant $P_1$ may transmit a hash value, instead of directly transmitting the value. In this case, the participant $P_0$ may convert the value received from the participant $P_2$ into a hash value and may perform an equality check between this hash value and the hash value received from the participant $P_1$. By transmitting a hash value in this way, the communication amount can be reduced.

The first to third participants $P_i$ (i=1, 2, 3) other than the zeroth participant $P_0$ can compute, by using the cyclic permutation $\sigma_0$ shared by the first to third participants $P_i$ (i=1, 2, 3) and the sub-shares held thereby, their shares to which the cyclic permutation $\sigma_0$ has been applied by themselves. The shares to which the cyclic permutation $\sigma_0$ has been applied can be finally constructed as follows.

$P_0: [\sigma_0(V)]_{L,0} = (\alpha_1 + \sigma_0(\Lambda_1), \alpha_2 + \sigma_0(\Lambda_2), \alpha_3 + \sigma_0(\Lambda_3))$ $P_1: [\sigma_0(V)]_{L,1} = (\alpha_0 + \sigma_0(M), \alpha_2 + \sigma_0(\Lambda_2), \alpha_3 + \sigma_0(\Lambda_3))$ $P_2: [\sigma_0(V)]_{L,2} = (\alpha_0 + \sigma_0(M), \alpha_1 + \sigma_0(\Lambda_1), \alpha_3 + \sigma_0(\Lambda_3))$ $P_3: [\sigma_0(V)]_{L,3} = (\alpha_0 + \sigma_0(M), \alpha_1 + \sigma_0(\Lambda_1), \alpha_2 + \sigma_0(\Lambda_2))$ The cyclic permutation $\sigma_0$ shared by the first to third participants $P_i$ (i=1, 2, 3) can be generated by using a key and a pseudorandom function shared by the first to third participants $P_i$ (i=1, 2, 3). That is, by using a pseudo random number generated by using a key and a pseudorandom function shared by the first to third participants $P_i$ (i=1, 2, 3) for a shift amount $R_0$ of the cyclic permutation $\sigma_0$, the cyclic permutation $\sigma_0$ shared by the first to third participant $P_i$ (i=1, 2, 3) can be constructed.

The cyclic permutation $\sigma_0$ can be featured by the shift amount $R_0$. A share $[R_0]_N$ having the shift amount $R_0$ that features the cyclic permutation $\sigma_0$ can be constructed as follows.

The share of the participant $P_0$: $[R_0]_{N,0} = (0, 0, 0)$

The share of the participant $P_1$: $[R_0]_{N,1} = (R_0, 0, 0)$

The share of the participant $P_2$: $[R_0]_{N,2} = (R_0, 0, 0)$

The share of the participant $P_3$: $[R_0]_{N,3} = (R_0, 0, 0)$

Regarding the share $[R_0]_N$ having the shift amount $R_0$ constructed as described above, although the participant $P_0$ cannot determine the shift amount $R_0$, the first to third participants $P_i$ (i=1, 2, 3) can determine the shift amount $R_0$. That is, the nature that the first to third participants $P_i$ (i=1, 2, 3) can trace the cyclic permutation although the zeroth participant $P_0$ cannot trace the cyclic permutation is maintained.

The cyclic permutation $\sigma_0$ constructed as described above is a cyclic permutation construction example in which the cyclic permutation $\sigma_0$ cannot be traced by the zeroth participant $P_0$ but can be traced by the first to third participants $P_i$ (i=1, 2, 3). The first to third participants $P_i$ (i=1, 2, 3) can alternately function in the same way as the zeroth participant $P_0$. As a result, it is possible to construct a cyclic permutation $\sigma_i$ (i=1, 2, 3) that cannot be traced by one of the first to third participants $P_i$ (i=1, 2, 3) but can be traced by the other participants.

Each of the cyclic permutations $\alpha_i$ (i=0, 1, 2, 3) constructed as described above is not traceable by one of the participants $P_i$ (i=0, 1, 2, 3). Thus, by synthesizing these cyclic permutations $\sigma_i$ (i=0, 1, 2, 3), it is possible to obtain $\sigma=\sigma_0 \sigma_1 \sigma_2 \sigma_3$ that can be traced by none of the participants $P_i$ (i=0, 1, 2, 3). That is, it is possible to construct a random cyclic permutation that can be traced by none of the participants $P_i$ (i=0, 1, 2, 3).

The fact that the shift amount of the random cyclic permutation $\sigma$ having the above nature can be computed by $R_0+R_1+R_2+R_3$ has already been described with reference to FIG. 3. If the reference target index is h, the index that needs to be referred to after the application of the random cyclic permutation is h'=h+$R_0+R_1+R_2+R_3$. In addition, although it is possible to compute the index h' that needs to be referred to after the application of the random cyclic permutation $\sigma$ having the above nature, the original index h can be kept secret.

(Secure Computation Method)

Figure 6:
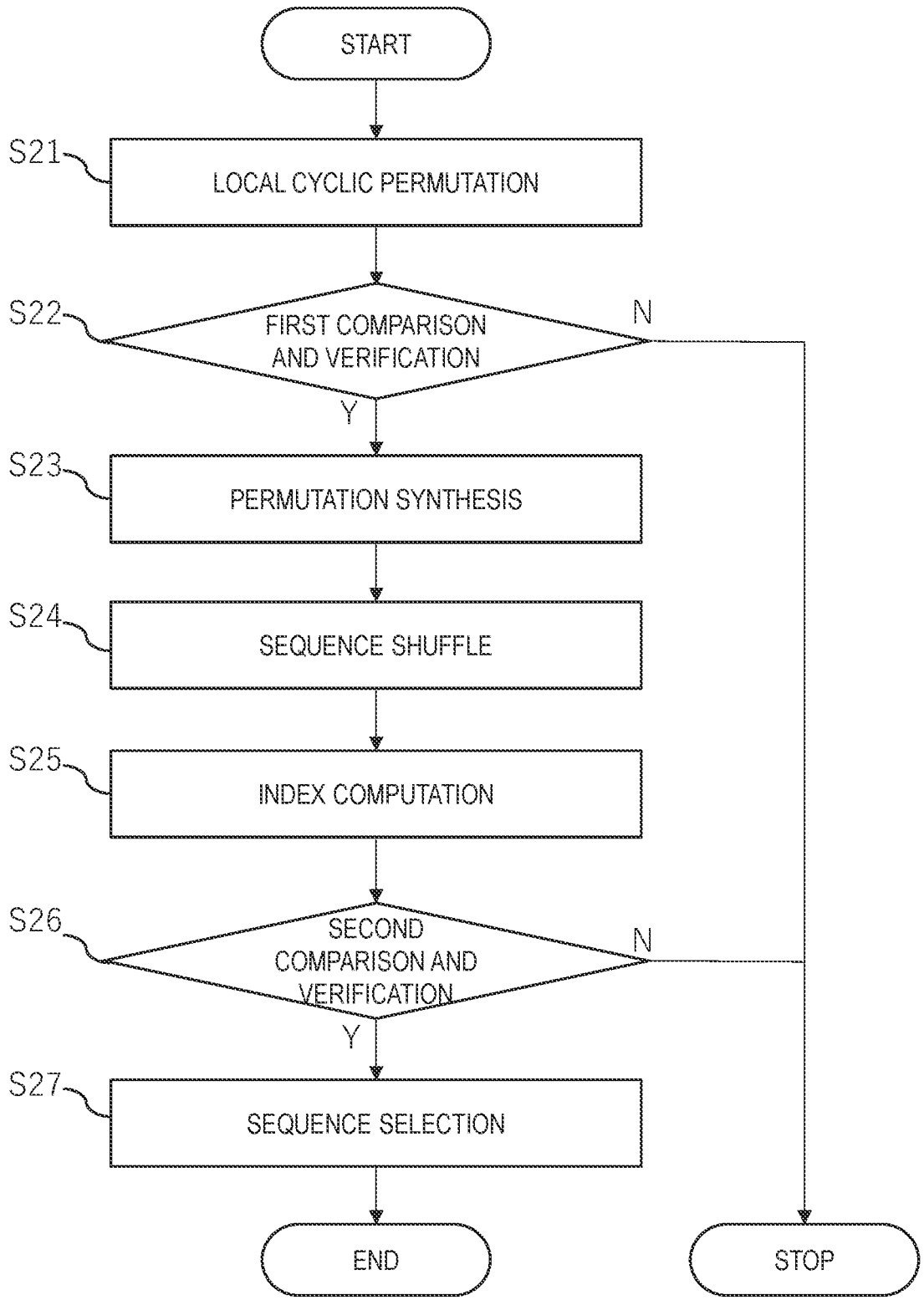
FIG. 6 is a flowchart illustrating an outline of a procedure of a secure computation method according to the second example embodiment.

FIG. 6 is a flowchart illustrating an outline of a procedure of a secure computation method according to the second example embodiment. The procedure of the secure computation method illustrated in FIG. 6 is only a typical example of the procedure of the secure computation and will be described to facilitate the description. In practice, the secure computation method can be modified, such as by changing the order of some of the steps or repeating some of the steps.

As illustrated in FIG. 6, the secure computation method according to the second example embodiment includes a local cyclic permutation step (step S21), a first comparison and verification step (step S22), a permutation synthesis step (step S23), a sequence shuffle step (step S24), an index computation step (step S25), a second comparison and verification step (step S26), and a sequence selection step (step S27).

The local cyclic permutation step (step S21) includes computing, by using a cyclic permutation shared by three of the zeroth to third secure computation server apparatuses $210_i$ (i=0, 1, 2, 3), a value of a cyclic permutation for the other secure computation server apparatus.

The first comparison and verification step (step S22) includes performing a fraud detection by performing an equality check on a plurality of values of cyclic permutations computed by the zeroth to third secure computation server apparatuses $210_i$ (i=0, 1, 2, 3) except one of the secure computation server apparatuses. Concretely, if the plurality of received values of the cyclic permutations are the same value (step S22; Y), the processing is continued. If the plurality of received values of the cyclic permutations are different values (step S22; N), it is determined that a dishonest participant among the participants has falsified a value, and the processing is stopped.

The permutation synthesis step (step S23) includes constituting a random cyclic permutation that is traceable by none of the zeroth to third secure computation server apparatuses $210_i$ (i=0, 1, 2, 3) by synthesizing the cyclic permutations of the zeroth to third secure computation server apparatuses $210_i$ (i=0, 1, 2, 3) constituted in the local cyclic permutation step (step S21).

The sequence shuffle step (step S24) includes applying the random cyclic permutation to the shares in the reference target sequence.

The index computation step (step S25) includes computing a share which indicates index and to which the random cyclic permutation has been applied by adding a share having shift amounts of the cyclic permutation constituted by the local cyclic permutation parts to the received share which indicates the index. This computation principle has already been described above.

The second comparison and verification step (step S26) includes receiving, when the share which indicates the index and to which the random cyclic permutation has been applied are reconstructed, shares not held by one secure computation server apparatus from the other secure computation server apparatuses and performing a fraud detection by performing an equality check on a plurality of shares which indicate indexes. The computations of the share which indicates the index and to which the random cyclic permutation has been applied in the index computation step (step S25) are performed as secure computations. Thus, when the share which indicates the index is reconstructed, the shares not held by one secure computation server apparatus are received from the other secure computation server apparatuses. That is, in this step, there is a possibility that a value could be falsified by a dishonest person who has slipped into the group of participants. Thus, in the second comparison and verification step (step S26), a fraud detection is performed by performing an equality check on the plurality of received shares which indicate indexes. Concretely, if the plurality of received values of the cyclic permutations are the same value (step S26; Y), the processing is continued. If the plurality of received values of the cyclic permutations are different values (step S26; N), it is determined that a dishonest participant among the participants has falsified a value, and the processing is stopped.

The sequence selection step (step S27) includes selecting, by using the reconstructed indexes obtained after the random cyclic permutation has been applied, a share corresponding to the reconstructed index from the shares in the sequence to which the random cyclic permutation has been applied.

As described above, the secure computation system and the secure computation method according to the second example embodiment enable a fraud detection while using a sequence reference protocol that achieves the communication cost with a constant number of rounds. If a falsification has been made, the processing can be stopped. That is, the secure computation system and the secure computation method according to the second example embodiment contribute to both reducing the communication cost and improving the security while using a sequence reference protocol.

Third Example Embodiment

Next, a secure computation system according to a third example embodiment will be described with reference to FIG. 7.

Figure 7:
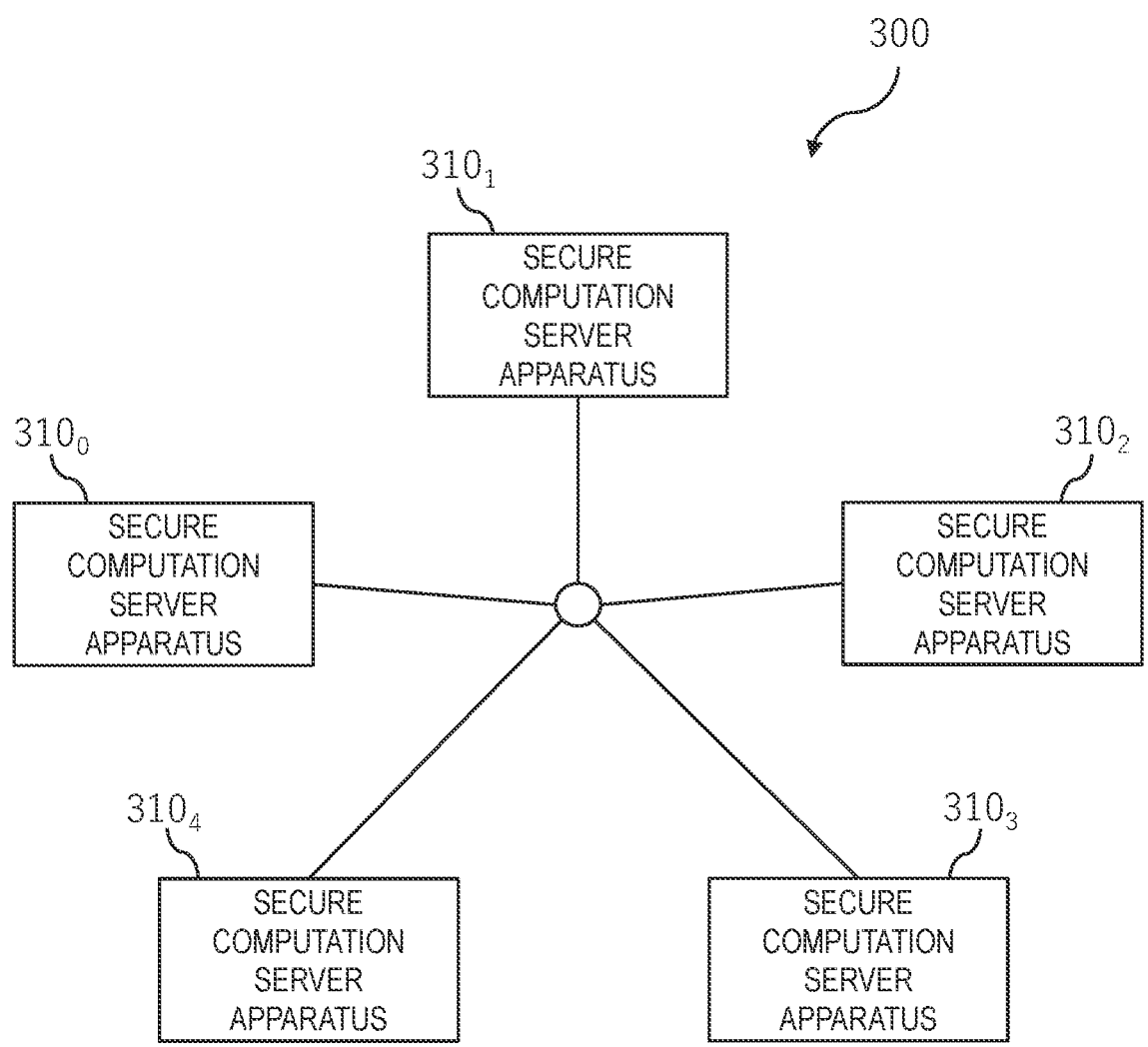
FIG. 7 is a block diagram illustrating a functional configuration example of a secure computation system according to a third example embodiment.

FIG. 7 is a block diagram illustrating a functional configuration example of the secure computation system according to the third example embodiment. As illustrated in FIG. 7, a secure computation system 300 according to the third example embodiment includes zeroth to fourth secure computation server apparatuses $310_i$ (i=0, 1, 2, 3, 4). The zeroth to fourth secure computation server apparatuses $310_i$ (i=0, 1, 2, 3, 4) are connected to each other via a network such that these apparatuses can communicate with each other.

The secure computation system 300 according to the third example embodiment illustrated in FIG. 7 is a secure computation system that receives a share which indicates index, and that refers to a share of an element in a sequence corresponding to the index from the shares in the sequence. Each of the zeroth to fourth secure computation server apparatuses $310_i$ (i=0, 1, 2, 3, 4) is operated by an independent participant $P_i$ (i=0, 1, 2, 3, 4). In addition, in the secure computation system 300 including the zeroth to fourth secure computation server apparatuses $310_i$ (i=0, 1, 2, 3, 4), even if part of the zeroth to fourth secure computation server apparatuses $310_i$ (i=0, 1, 2, 3, 4) is operated by a dishonest participant, a fraud can be detected. When a fraud is detected, the secure computation system 300 can stop its processing.

[Secret Sharing Scheme]

The secure computation system 300 according to the third example embodiment can adopt a 2-out-of-5 replicated secret sharing scheme. Concretely, the shares of an element v on a residue class ring $Z_L$ of modulo L on the residue class ring $Z_L$ (v∈$Z_L$) are constituted as follows.

$$[v]_L = ([v]_{L,0}, [v]_{L,1}, [v]_{L,2}, [v]_{L,3}, [v]_{L,4})$$

where $v = v_0 + v_1 + v_2 + v_3 + v_4$ mod L

The share of the participant $P_i$ is defined as $[v]_{L,i} = (v_i, v_{i+1}, v_{i+1}, v_{i+3})$. Note that $x_{4+1} = x_0$.

The shares regarding a sequence V having a sequence length N (V=($v_0, v_1, \ldots, v_j, \ldots, v_{N-1}$)) are constructed as $V_i = (v_{0,i}, \ldots, v_{N-1,i})$ (i=0, 1, 2, 3, 4) where $v_j = v_{j,0} + v_{j,1} + v_{j,2} + v_{j,3} + v_{j,4}$ mod L.

[Shuffle]

For example, a case in which a cyclic permutation for the zeroth participant $P_0$ is computed by using a cyclic permutation shared by the first to fourth participants $P_i$ (i=1, 2, 3, 4) will be described. The cyclic permutation for the zeroth participant $P_0$ can be constituted as follows by using a cyclic permutation Go shared by the first to fourth participants $P_i$ (i=1, 2, 3, 4).

The first to fourth participants $P_i$ (i=1, 2, 3, 4) apply the cyclic permutation $\sigma_0$ to the values of $V_i$ ($V_i = (v_{0,i}, \ldots, v_{N-1,i})$ (i=0, 1, 2, 3, 4)), mask the resultant values, and transmit the masked values to the zeroth participant $P_0$. In other words, the first to fourth participants $P_i$ (i=1, 2, 3, 4) compute, for the zeroth participant $P_0$, the values of $v_1$ (i=0, 1, 2, 3, 4) to which the cyclic permutation $\sigma_0$ has been applied, and transmit these values to the zeroth participant $P_0$.

Senders $\{P_2, P_3, P_4\}$: $\alpha_0 + \sigma_0(V_0)$

Senders $\{P_1, P_3, P_4\}$: $\alpha_1 + \sigma_0(V_1)$

Senders $\{P_1, P_2, P_4\}$: $\alpha_2 + \sigma_0(V_2)$

Senders $\{P_1, P_2, P_3\}$: $\alpha_3 + \sigma_0(V_3)$

Note that $\alpha_i = (\alpha_{i,0}, \alpha_{i,1} \ldots \alpha_{i,j} \ldots, \alpha_{i,N-1})$ (i=1, 2, 3, 4) is a mask that can be computed with a key and a pseudorandom function that only the sender knows, satisfying $\alpha_{0,j}+\alpha_{i,j}+\alpha_{2,j}+\alpha_{3,j}=0$ mod L (i=0, 1, . . . , N−1).

As seen from the above construction, the zeroth participant $P_0$ receives three same values (obtained by applying the cyclic permutation $\sigma_0$ to $V_i$ (i=0, 1, 2, 3, 4) and masking the resultant values). Next, the zeroth participant $P_0$ selects, from the plurality of values of the cyclic permutations, a majority of values determined to be the same value, and continues its processing. That is, even if a falsification has been made, the zeroth participant $P_0$ can select an accurate value and continue its processing.

Concretely, the participant $P_0$ selects at least two of the three received values, the two values having been determined to be the same value, as an accurate value. That is, even if a falsification has been made, since two of the three received values are the same value, the participant $P_0$ can select an accurate value. For example, while the participant $P_1$, the participant $P_2$, and the participant $P_3$ transmit the same value to the participant $P_0$, for example, the participant $P_1$ and the participant $P_2$ may transmit a hash value, instead of directly transmitting the value. In this case, the participant $P_0$ may convert the value received from the participant $P_3$ into a hash value, and perform an equality check between this hash value and the hash values received from the participant $P_1$ and the participant $P_2$. By transmitting hash values in this way, the communication amount can be reduced.

The first to fourth participants $P_i$ (i=1, 2, 3, 4) other than the zeroth participant $P_0$ can compute, by using the cyclic permutation $\sigma_0$ shared by the first to fourth participants $P_i$ (i=1, 2, 3, 4) and the sub-shares held thereby, their shares to which the cyclic permutation $\sigma_0$ has been applied by themselves. The shares to which the cyclic permutation $\sigma_0$ has been applied can be finally constructed as follows.

$$P_i: [\sigma_0(V)]_{L,i} = (\alpha_i + \sigma_0(V_i), \alpha_{i+1} + \sigma_0(V_{i+1}), \alpha_{i+1} + \sigma_0(V_{i+2}), \alpha_{i+3} + \sigma_0(V_{i+3}))$$

The cyclic permutation $\sigma_0$ shared by the first to fourth participants $P_i$ (i=1, 2, 3, 4) can be generated by using a key and a pseudorandom function shared by the first to fourth participants $P_i$ (i=1, 2, 3, 4). That is, by using a pseudo random number generated by using a key and a pseudorandom function shared by the first to fourth participants $P_i$ (i=1, 2, 3, 4) for a shift amount $R_0$ of the cyclic permutation $\sigma_0$, the cyclic permutation $\sigma_0$ shared by the first to fourth participants $P_i$ (i=1, 2, 3, 4) can be constructed.

The cyclic permutation $\sigma_0$ constructed as described above is a cyclic permutation construction example in which the cyclic permutation $\sigma_0$ cannot be traced by the zeroth participant $P_0$ but can be traced by the first to fourth participants $P_i$ (i=1, 2, 3, 4). The first to fourth participant $P_i$ (i=1, 2, 3, 4) can alternately function in the same way as the zeroth participant $P_0$. As a result, it is possible to construct a cyclic permutation $\sigma_i$ (i=1, 2, 3, 4) that cannot be traced by one of the first to fourth participants $P_i$ (i=1, 2, 3, 4) but can be traced by the other participants.

Each of the cyclic permutations $\sigma_i$ (i=0, 1, 2, 3, 4) constructed as described above is not traceable by one of the participants $P_i$ (i=0, 1, 2, 3, 4). Thus, by synthesizing these cyclic permutations $\sigma_i$ (i=0, 1, 2, 3, 4), it is possible to obtain $\sigma=\sigma_0 \sigma_1 \sigma_2 \sigma_3 \sigma_4$ that can be traced by none of the participants $P_i$ (i=0, 1, 2, 3, 4). That is, it is possible to construct a random cyclic permutation that can be traced by none of the participants $P_i$ (i=0, 1, 2, 3, 4).

The fact that the shift amount of the random cyclic permutation a having the above nature can be computed by $R_0+R_1+R_2+R_3+R_4$ has already been described with reference to FIG. 3. If the reference target index is h, the index that needs to be referred to after the application of the random cyclic permutation is h'=h+$R_0$+$R_1$+$R_2$+$R_3$+$R_4$. In addition, although it is possible to compute the index h' that needs to be referred to after the application of the random cyclic permutation a having the above nature, the original index h can be kept secret.

(Secure Computation Method)

Figure 8:
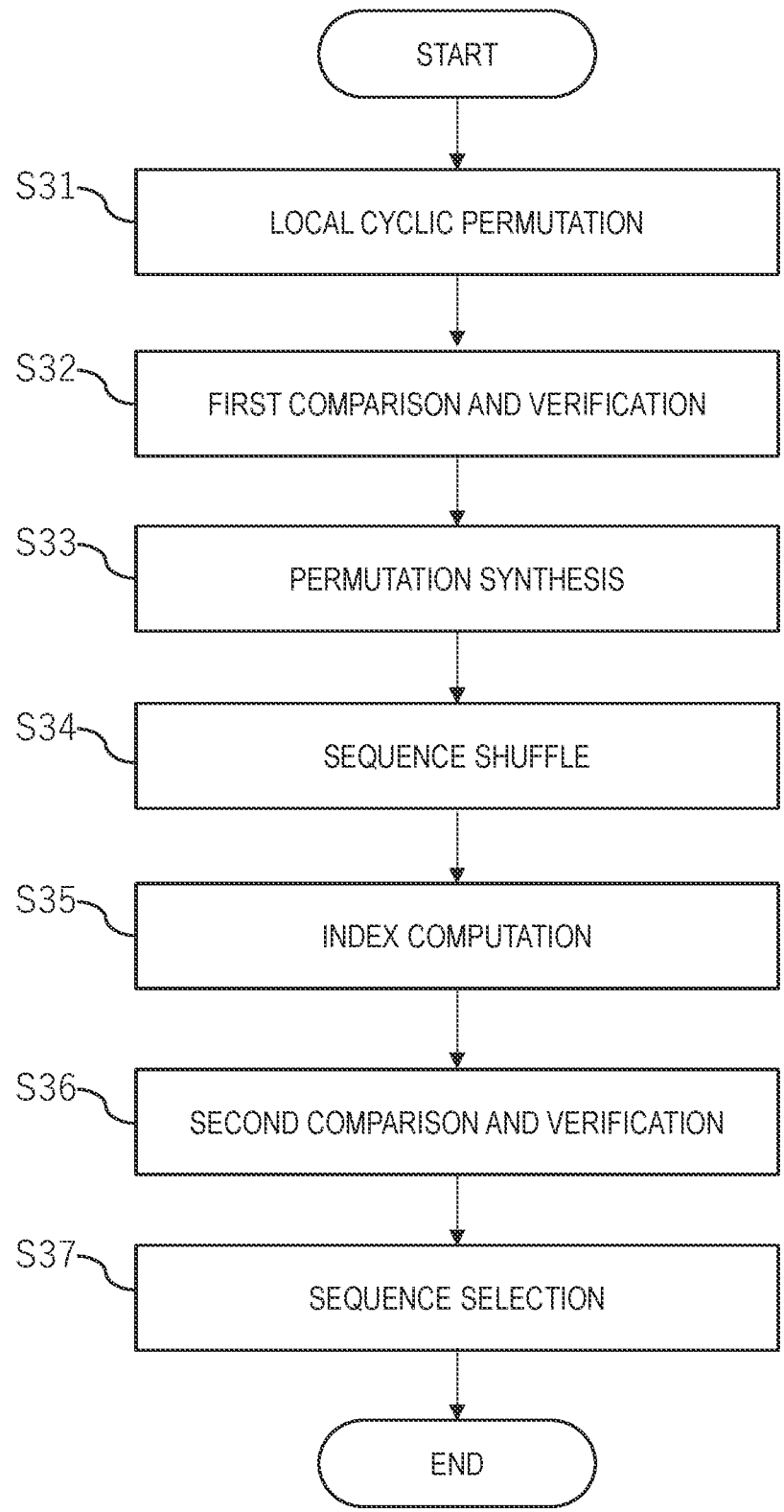
FIG. 8 is a flowchart illustrating an outline of a procedure of a secure computation method according to the third example embodiment.

FIG. 8 is a flowchart illustrating an outline of a procedure of a secure computation method according to the third example embodiment. The procedure of the secure computation method illustrated in FIG. 8 is only a typical example of the procedure of the secure computation and will be described to facilitate the description. In practice, the secure computation method can be modified, such as by changing the order of some of the steps or repeating some of the steps.

As illustrated in FIG. 8, the secure computation method according to the third example embodiment includes a local cyclic permutation step (step S31), a first comparison and verification step (step S32), a permutation synthesis step (step S33), a sequence shuffle step (step S34), an index computation step (step S35), a second comparison and verification step (step S36), and a sequence selection step (step S37).

The local cyclic permutation step (step S31) includes computing, by using a cyclic permutation shared by four of the zeroth to fourth secure computation server apparatuses $310_i$ (i=0, 1, 2, 3, 4), a value of a cyclic permutation for the other secure computation server apparatus.

The first comparison and verification step (step S32) includes performing a fraud detection by performing an equality check on a plurality of values of cyclic permutations computed by the zeroth to fourth secure computation server apparatuses $310_i$ (i=0, 1, 2, 3, 4) except one of the secure computation server apparatuses. Concretely, the first comparison and verification step (step S32) includes selecting at least two of the three received values, the two values having been determined to be the same value, as an accurate value, and continuing the processing by selecting the accurate value even if a falsification has been made.

The permutation synthesis step (step S33) includes constituting a random cyclic permutation that is traceable by none of the zeroth to fourth secure computation server apparatuses $310_i$ (i=0, 1, 2, 3, 4) by synthesizing the cyclic permutations constituted in the local cyclic permutation step (step S31).

The sequence shuffle step (step S34) includes applying the random cyclic permutation to the shares in the reference target sequence.

The index computation step (step S35) includes computing a share which indicates index and to which the random cyclic permutation has been applied by adding a share having a shift amount of the cyclic permutation constituted by the local cyclic permutation parts to the received share which indicates the index. This computation principle has already been described above.

The second comparison and verification step (step S36) includes receiving, when the share which indicates the index and to which the random cyclic permutation has been applied are reconstructed, shares not held by one secure computation server apparatus from the other secure computation server apparatuses and performing a fraud detection by performing an equality check on a plurality of shares which indicate indexes. The computations of the share which indicates the index and to which the random cyclic permutation has been applied in the index computation step (step S35) are performed as secure computations. Thus, when the shares which indicate the indexes are reconstructed, the share not held by one secure computation server apparatus is received from the other secure computation server apparatuses. That is, in this step, there is a possibility that a value could be falsified by a dishonest person who has slipped into the group of participants. Thus, in the second comparison and verification step (step S36), a fraud detection is performed by performing an equality check on the plurality of received shares which indicate indexes. Concretely, at least two of the three received values, the two values having been determined to be the same value, are selected as an accurate value. Even if a falsification has been made, an accurate value is selected and the processing is continued.

The sequence selection step (step S37) includes selecting, by using the reconstructed index obtained after the random cyclic permutation has been applied, a share corresponding to the reconstructed index from the shares in the sequence to which the random cyclic permutation has been applied.

As described above, the secure computation system and the secure computation method according to the third example embodiment enable a fraud detection while using a sequence reference protocol that achieves the communication cost with a constant number of rounds. Even if a falsification has been made, the processing can be continued by selecting an accurate value. That is, the secure computation system and the secure computation method according to the third example embodiment contribute to both reducing the communication cost and improving the security while using a sequence reference protocol.

[Hardware Configuration Example]

Figure 9:
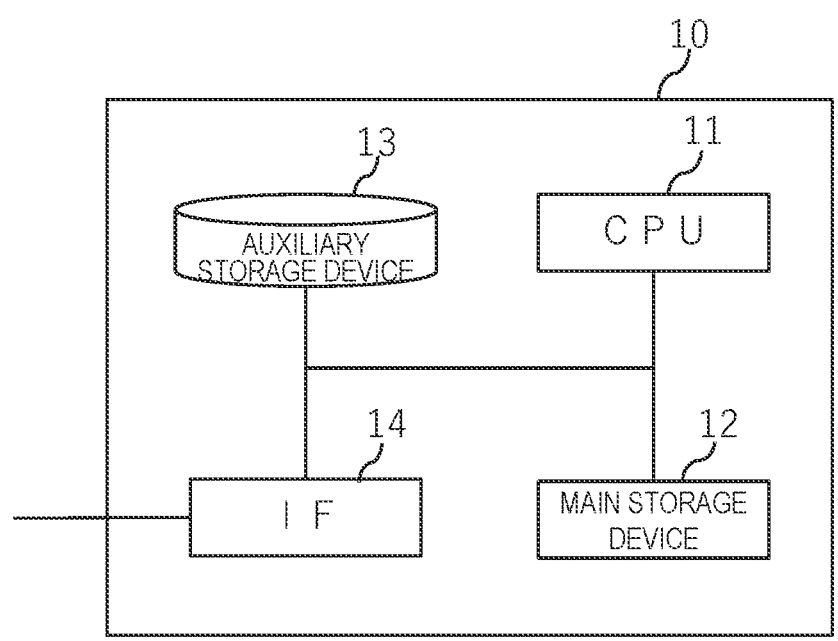
FIG. 9 is a diagram illustrating a hardware configuration example of a secure computation server apparatus.

FIG. 9 is a diagram illustrating a hardware configuration example of a secure computation server apparatus. That is, the hardware configuration example illustrated in FIG. 9 is a hardware configuration example of any one of the secure computation server apparatuses $110_i$, $210_i$, and $310_i$. An information processing apparatus (a computer) that adopts the hardware configuration illustrated in FIG. 9 can realize the individual functions of any one of the secure computation server apparatuses $110_i$, $210_i$, and $310_i$ by executing the corresponding one of the above secure computation methods as a program.

The hardware configuration example illustrated in FIG. 9 is an example of the hardware configuration that realizes the individual functions of any one of the secure computation server apparatuses $110_i$, $210_i$, and $310_i$ and does not limit the hardware configuration of any one of the secure computation server apparatuses $110_i$, $210_i$, and $310_i$. The secure computation server apparatuses $110_i$, $210_i$, and $310_i$ may include hardware not illustrated in FIG. 9.

As illustrated in FIG. 9, a hardware configuration 10 that can be adopted by any one of the secure computation server apparatuses $110_i$, $210_i$, and $310_i$ includes, for example, a CPU (Central Processing Unit) 11, a main storage device 12, an auxiliary storage device 13, and an IF (Interface) part 14, which are connected to each other via an internal bus.

The CPU 11 executes various commands included in the secure computation program executed by the corresponding one of the secure computation server apparatuses $110_i$, $210_i$, and $310_i$. The main storage device 12 is, for example, a RAM (Random Access Memory) and temporarily stores various kinds of programs such as the secure computation program executed by the corresponding one of the secure computation server apparatuses $110_i$, $210_i$, and $310_i$ so that the CPU 11 can execute the programs.

The auxiliary storage device 13 is, for example, an HDD (Hard Disk Drive) and can store, in the mid-to-long term, various kinds of programs such as the secure computation program executed by the corresponding one of the secure computation server apparatuses $110_i$, $210_i$, and $310_i$. These various kinds of programs such as the secure computation program can be recorded in a non-transitory computer-readable storage medium and can be provided as a program product. The auxiliary storage device 13 can be used to store, in the mid-to-long term, various kinds of programs such as the secure computation program recorded in a non-transitory computer-readable storage medium. The IF part 14 provides an interface regarding the input and output among the corresponding secure computation server apparatuses $110_i$, $210_i$, or $310_i$.

An information processing apparatus that adopts the hardware configuration 10 as described above realizes the functions of any one of the secure computation server apparatuses $110_i$, $210_i$, and $310_i$ by executing the corresponding one of the above-described secure computation methods as a program.

The above example embodiments can partially or entirely be described, but not limited to, as the following notes.

[Note 1]

A secure computation system, including at least four secure computation server apparatuses connected to each other via a network, receiving a share which indicates index, and referring to a share of an element in a sequence corresponding to the index from the shares in the sequence, an individual one of the secure computation server apparatuses including:

a local cyclic permutation part that computes, by using a cyclic permutation shared by (other) secure computation server apparatuses except one of the at least four secure computation server apparatuses, a value of a cyclic permutation for the one secure computation server apparatus;

a comparison and verification part that performs a fraud detection by performing an equality check on a plurality of values of cyclic permutations computed by the secure computation server apparatuses except oneself of the at least four secure computation server apparatuses;

a permutation synthesis part that constitutes a random cyclic permutation that is traceable by none of the at least four secure computation server apparatuses by synthesizing the cyclic permutations constituted by the local cyclic permutation parts of the secure computation server apparatuses;

a sequence shuffle part that applies the random cyclic permutation to the shares in the sequence;

an index computation part that computes a share which indicates index and to which the random cyclic permutation has been applied by adding a share having a shift amount of the cyclic permutation constituted by the local cyclic permutation parts to the received share which indicates the index; and a sequence selection part that reconstructs the share which indicates the index and to which the random cyclic permutation has been applied and that selects a share corresponding to the reconstructed index from the shares in the sequence to which the random cyclic permutation has been applied.

[Note 2]

The secure computation system according to note 1; wherein the individual one of the secure computation server apparatuses includes a second comparison and verification part that receives, when the shares which indicate indexes and to which the random cyclic permutation has been applied are reconstructed, shares not held by own secure computation server apparatus from the other secure computation server apparatuses and that performs a fraud detection by performing an equality check on the plurality of received shares which indicate the indexes.

[Note 3]

The secure computation system according to note 1 or 2; wherein the cyclic permutation shared by (other) secure computation server apparatuses except one of the at least four secure computation server apparatuses is generated by using a key and a pseudorandom function shared by the secure computation server apparatuses except one of the at least four secure computation server apparatuses.

[Note 4]

The secure computation system according to note 3; wherein the shift amount of the cyclic permutation is generated by using a key and a pseudorandom function shared by the secure computation server apparatuses except one of the at least four secure computation server apparatuses.

[Note 5]

The secure computation system according to any one of notes 1 to 4; wherein the secure computation system is based on a 2-out-of-4 replicated secret sharing scheme including four of the secure computation server apparatuses and stops processing of the secure computation system when a fraud is detected by the equality check.

[Note 6]

The secure computation system according to any one of notes 1 to 4; wherein the secure computation system is based on a 2-out-of-5 replicated secret sharing scheme including five of the secure computation server apparatuses, selects a majority of values determined to be the same value by the equality check, and continues processing of the secure computation system.

[Note 7]

A secure computation server apparatus, which is one of at least four secure computation server apparatuses connected to each other via a network, each of the secure computation server apparatuses receiving a share which indicates an index, and referring to a share of an element in a sequence corresponding to the index from the shares in the sequence, the secure computation server apparatus including:

a local cyclic permutation part that computes, by using a cyclic permutation shared by (other) secure computation server apparatuses except one of the at least four secure computation server apparatuses, a value of a cyclic permutation for the one secure computation server apparatus;

a comparison and verification part that performs a fraud detection by performing an equality check on a plurality of values of cyclic permutations computed by the secure computation server apparatuses except oneself of the at least four secure computation server apparatuses;

a permutation synthesis part that constitutes a random cyclic permutation that is traceable by none of the at least four secure computation server apparatuses by synthesizing the cyclic permutations constituted by the local cyclic permutation parts of the secure computation server apparatuses;

a sequence shuffle part that applies the random cyclic permutation to the shares in the sequence;

an index computation part that computes a share which indicates an index and to which the random cyclic permutation has been applied by adding a share having a shift amount of the cyclic permutation constituted by the local cyclic permutation parts to the received shares which indicates the index; and a sequence selection part that reconstructs the share which indicates the index and to which the random cyclic permutation has been applied and that selects a share corresponding to the reconstructed index from the shares in the sequence to which the random cyclic permutation has been applied.

[Note 8]

A secure computation method, using at least four secure computation server apparatuses connected to each other via a network, receiving a share which indicates an index, and referring to a share of an element in a sequence corresponding to the index from the shares in the sequence, the secure computation method comprising:

a local cyclic permutation step of computing, by using a cyclic permutation shared by (other) secure computation server apparatuses except one of the at least four secure computation server apparatuses, a value of a cyclic permutation for the one secure computation server apparatus;

a comparison and verification step of performing a fraud detection by performing an equality check on a plurality of values of cyclic permutations computed by the secure computation server apparatuses except oneself of the at least four secure computation server apparatuses;

a permutation synthesis step of constituting a random cyclic permutation that is traceable by none of the at least four secure computation server apparatuses by synthesizing the cyclic permutations constituted in the local cyclic permutation step;

a sequence shuffle step of applying the random cyclic permutation to the shares in the sequence;

an index computation step of computing a share which indicates an index and to which the random cyclic permutation has been applied by adding a share having a shift amount of the cyclic permutation constituted by the local cyclic permutation step to the received share which indicates the index; and a sequence selection step of reconstructing the share which indicates the index and to which the random cyclic permutation has been applied and selecting a share corresponding to the reconstructed index from the shares in the sequence to which the random cyclic permutation has been applied.

[Note 9]

The secure computation method according to note 8; wherein the local cyclic permutation step, the comparison and verification step, the permutation synthesis step, and the sequence shuffle step are performed before the share which indicates the index is received.

[Note 10]

A secure computation program, causing each of at least four secure computation server apparatuses connected to each other via a network, each of the secure computation server apparatuses receiving a share which indicates an index, and referring to a share of an element in a sequence corresponding to the index from the shares in the sequence, to perform:

local cyclic permutation processing for computing, by using a cyclic permutation shared by the secure computation server apparatuses except one of the at least four secure computation server apparatuses, a value of a cyclic permutation for the one secure computation server apparatus;

comparison and verification processing for performing a fraud detection by performing an equality check on a plurality of values of cyclic permutations computed by the secure computation server apparatuses except oneself of the at least four secure computation server apparatuses;

permutation synthesis processing for constituting a random cyclic permutation that is traceable by none of the at least four secure computation server apparatuses by synthesizing the cyclic permutations constituted by the local cyclic permutation processing;

sequence shuffle processing for applying the random cyclic permutation to the shares in the sequence;

index computation processing for computing a share which indicates an index and to which the random cyclic permutation has been applied by adding a share having a shift amount of the cyclic permutation constituted by the local cyclic permutation processing to the received share which indicates the index; and sequence selection processing for reconstructing the shares which indicates the index and to which the random cyclic permutation has been applied and selecting a share corresponding to the reconstructed index from the shares in the sequence to which the random cyclic permutation has been applied.

The disclosure of the above NPL is incorporated herein by reference thereto. Modifications and adjustments of the example embodiments or examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST

100, 200, 300 secure computation system
110$_i$, 210$_i$, 310$_i$ secure computation server apparatus
111 local cyclic permutation part
112 comparison and verification part
113 permutation synthesis part
114 sequence shuffle part
115 index computation part
116 sequence selection part
10 hardware configuration
11 CPU (Central Processing Unit)
12 main storage device
13 auxiliary storage device
14 IF (Interface) part

What is claimed is:

1. A secure computation system, comprising at least four secure computation server apparatuses connected to each other via a network, wherein:

each of the at least four secure computation server apparatuses receiving a share which indicates an index, and referring to a share of an element in a sequence corresponding to the index from shares in the sequence, an individual one of the at least four secure computation server apparatuses, being implemented by a memory and a processor, to execute operations performed by:

a local cyclic permutation part that computes, by using a cyclic permutation shared by secure computation server apparatuses except one secure computation server apparatus of the at least four secure computation server apparatuses, a value of the cyclic permutation for the one secure computation server apparatus;

a comparison and verification part that performs a fraud detection by performing an equality check on a plurality of values of cyclic permutations computed by the secure computation server apparatuses except oneself of the at least four secure computation server apparatuses;

a permutation synthesis part that constitutes a random cyclic permutation, that is traceable by none of the at least four secure computation server apparatuses, by synthesizing the cyclic permutations constituted by individual local cyclic permutation parts of the secure computation server apparatuses;

a sequence shuffle part that applies the random cyclic permutation to the shares in the sequence;

an index computation part that computes another share which indicates another index and to which the random cyclic permutation has been applied by adding a share having a shift amount of the cyclic permutation constituted by the individual local cyclic permutation parts to the received share which indicates the index; and a sequence selection part that reconstructs the share which indicates the index and to which the random cyclic permutation has been applied and that selects the share corresponding to the index from the shares in the sequence to which the random cyclic permutation has been applied.

2. The secure computation system according to claim 1, wherein the individual one of the at least four secure computation server apparatuses comprises a second comparison and verification part that receives, when the shares which indicate indexes and to which the random cyclic permutation has been applied are reconstructed, shares not held by own secure computation server apparatus from the other secure computation server apparatuses and that performs a fraud detection by performing an equality check on the received shares which indicate the indexes.

3. The secure computation system according to claim 1, wherein the cyclic permutation is generated by using a key and a pseudorandom function shared by the secure computation server apparatuses except the one secure computation server apparatus of the at least four secure computation server apparatuses.

4. The secure computation system according to claim 1, wherein the shift amount of the cyclic permutation is generated by using a key and a pseudorandom function shared by the secure computation server apparatuses except the one secure computation server apparatus of the at least four secure computation server apparatuses.

5. The secure computation system according to claim 1, wherein the secure computation system is based on a 2-out-of-4 replicated secret sharing scheme including four of the secure computation server apparatuses and stops processing of the secure computation system when a fraud is detected by the equality check.

6. The secure computation system according to claim 1, wherein the secure computation system is based on a 2-out-of-5 replicated secret sharing scheme including five of the secure computation server apparatuses, selects a majority of values determined to be a same value by the equality check, and continues processing of the secure computation system.

7. A secure computation server apparatus, which is one of at least four secure computation server apparatuses connected to each other via a network, wherein:
each of the at least four secure computation server apparatuses receiving a share which indicates an index, and referring to a share of an element in a sequence corresponding to the index from shares in the sequence,
the secure computation server apparatus, being implemented by a memory and a processor, to execute operations performed by:
a local cyclic permutation part that computes, by using a cyclic permutation shared by secure computation server apparatuses except one secure computation server apparatus of the at least four secure computation server apparatuses, a value of the cyclic permutation for the one secure computation server apparatus;
a comparison and verification part that performs a fraud detection by performing an equality check on a plurality of values of cyclic permutations computed by the secure computation server apparatuses except oneself of the at least four secure computation server apparatuses;
a permutation synthesis part that constitutes a random cyclic permutation, that is traceable by none of the at least four secure computation server apparatuses, by synthesizing the cyclic permutations constituted by individual local cyclic permutation parts of the secure computation server apparatuses;
a sequence shuffle part that applies the random cyclic permutation to the shares in the sequence;
an index computation part that computes another share which indicates another index and to which the random cyclic permutation has been applied by adding a share having a shift amount of the cyclic permutation constituted by the individual local cyclic permutation parts to the received share which indicates the index; and
a sequence selection part that reconstructs the share which indicates the index and to which the random cyclic permutation has been applied and that selects the share corresponding to the index from the shares in the sequence to which the random cyclic permutation has been applied.

8. The secure computation server apparatus according to claim 7, wherein individual one of the secure computation server apparatuses comprises a second comparison and verification part that receives, when the shares which indicate indexes and to which the random cyclic permutation has been applied are reconstructed, shares not held by own secure computation server apparatus from the other secure computation server apparatuses and that performs a fraud detection by performing an equality check on the received shares which indicate the indexes.

9. The secure computation server apparatus according to claim 7, wherein the cyclic permutation is generated by using a key and a pseudorandom function shared by the secure computation server apparatuses except the one secure computation server apparatus of the at least four secure computation server apparatuses.

10. The secure computation server apparatus according to claim 7, wherein the shift amount of the cyclic permutation is generated by using a key and a pseudorandom function shared by the secure computation server apparatuses except the one secure computation server apparatus of the at least four secure computation server apparatuses.

11. The secure computation server apparatus according to claim 7, wherein the secure computation server apparatus is based on a 2-out-of-4 replicated secret sharing scheme including four of the secure computation server apparatuses and stops processing of the secure computation server apparatus when a fraud is detected by the equality check.

12. The secure computation server apparatus according to claim 7, wherein the secure computation server apparatus is based on a 2-out-of-5 replicated secret sharing scheme including five of the secure computation server apparatuses, selects a majority of values determined to be a same value by the equality check, and continues processing of the secure computation server apparatus.

13. A secure computation method, using at least four secure computation server apparatuses connected to each other via a network, the secure computation method comprising steps of:
receiving a share which indicates an index, and referring to a share of an element in a sequence corresponding to the index from shares in the sequence;
a local cyclic permutation step of computing, by using a cyclic permutation shared by secure computation server apparatuses except one secure computation server apparatus of the at least four secure computation server apparatuses, a value of the cyclic permutation for the one secure computation server apparatus;
a comparison and verification step of performing a fraud detection by performing an equality check on a plurality of values of cyclic permutations computed by the secure computation server apparatuses except oneself of the at least four secure computation server apparatuses;
a permutation synthesis step of constituting a random cyclic permutation, that is traceable by none of the at least four secure computation server apparatuses, by synthesizing the cyclic permutations constituted in the local cyclic permutation step;
a sequence shuffle step of applying the random cyclic permutation to the shares in the sequence;
an index computation step of computing another share which indicates another index and to which the random cyclic permutation has been applied by adding a share having a shift amount of the cyclic permutation constituted by the local cyclic permutation step to the received share which indicates the index; and
a sequence selection step of reconstructing the share which indicates the index and to which the random cyclic permutation has been applied and selecting the share corresponding to the index from the shares in the sequence to which the random cyclic permutation has been applied.

14. The secure computation method according to claim 13, wherein the local cyclic permutation step, the comparison and verification step, the permutation synthesis step, and the sequence shuffle step are performed before the share which indicates the index is received.

15. The secure computation method according to claim 13, wherein the secure computation method comprises a second comparison and verification step of receiving, when the shares which indicate indexes and to which the random cyclic permutation has been applied are reconstructed, shares not held by own secure computation server apparatus from the other secure computation server apparatuses and that performs a fraud detection by performing an equality check on the received shares which indicate the indexes.

16. The secure computation method according to claim 13, wherein the cyclic permutation is generated by using a key and a pseudorandom function shared by the secure computation server apparatuses except the one secure computation server apparatus of the at least four secure computation server apparatuses.

17. The secure computation method according to claim 13, wherein the shift amount of the cyclic permutation is generated by using a key and a pseudorandom function shared by the secure computation server apparatuses except the one secure computation server apparatus of the at least four secure computation server apparatuses.

18. The secure computation method according to claim 13, wherein the secure computation method is based on a 2-out-of-4 replicated secret sharing scheme including four of the secure computation server apparatuses and stops processing of the secure computation method when a fraud is detected by the equality check.

19. The secure computation method according to claim 13, wherein the secure computation method is based on a 2-out-of-5 replicated secret sharing scheme including five of the secure computation server apparatuses, selects a majority of values determined to be a same value by the equality check, and continues processing of the secure computation method.

20. A non-transient computer readable medium storing secure computation program, causing each of at least four secure computation server apparatuses connected to each other via a network and being implemented by at least one processor, each of the at least four secure computation server apparatuses receiving a share which indicates an index, and referring to a share of an element in a sequence corresponding to the index from shares in the sequence, to perform:

local cyclic permutation processing for computing, by using a cyclic permutation shared by secure computation server apparatuses except one secure computation server apparatus of the at least four secure computation server apparatuses, a value of the cyclic permutation for the one secure computation server apparatus;

comparison and verification processing for performing a fraud detection by performing an equality check on a plurality of values of cyclic permutations computed by the secure computation server apparatuses except oneself of the at least four secure computation server apparatuses;

permutation synthesis processing for constituting a random cyclic permutation, that is traceable by none of the at least four secure computation server apparatuses, by synthesizing the cyclic permutations constituted by the local cyclic permutation processing;

sequence shuffle processing for applying the random cyclic permutation to the shares in the sequence;

index computation processing for computing another share which indicates another index and to which the random cyclic permutation has been applied by adding a share having a shift amount of the cyclic permutation constituted by the local cyclic permutation processing to the received share which indicates the index; and sequence selection processing for reconstructing the share which indicates the index and to which the random cyclic permutation has been applied and selecting the share corresponding to the index from the shares in the sequence to which the random cyclic permutation has been applied.

* * * * *